US011606728B1

(12) United States Patent
Yau et al.

(10) Patent No.: US 11,606,728 B1
(45) Date of Patent: Mar. 14, 2023

(54) INTERWORKING FUNCTION FOR VOLTE OUTBOUND ROAMING

(71) Applicant: Syniverse Technologies, LLC, Tampa, FL (US)

(72) Inventors: Edward Yau, Tseung Kwan O (HK); Brian Beach, Tampa, FL (US); Prashant Datar, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/872,237

(22) Filed: Jul. 25, 2022

(51) Int. Cl.
*H04W 4/00* (2018.01)
*H04W 36/00* (2009.01)
*H04L 65/1016* (2022.01)
*H04W 76/16* (2018.01)
*H04W 8/20* (2009.01)
*H04W 8/02* (2009.01)

(52) U.S. Cl.
CPC ..... *H04W 36/0022* (2013.01); *H04L 65/1016* (2013.01); *H04W 8/02* (2013.01); *H04W 8/20* (2013.01); *H04W 76/16* (2018.02)

(58) Field of Classification Search
CPC ... H04L 65/10; H04L 65/1016; H04L 65/102; H04L 65/1023; H04L 65/1026; H04L 65/1033; H04L 65/1036; H04W 8/02; H04W 8/04; H04W 8/06; H04W 8/065; H04W 8/08; H04W 8/20; H04W 36/0011; H04W 36/0016; H04W 36/0022; H04W 76/10; H04W 76/15; H04W 76/16
See application file for complete search history.

(56) References Cited

U.S. PATENT DOCUMENTS

| 9,749,904 B1 | 8/2017 | Zhang et al. |
| 9,794,769 B2 | 10/2017 | Dubesset et al. |
| 11,350,251 B2 | 5/2022 | Yau et al. |
| 2014/0169286 A1 | 6/2014 | Xu et al. |

*Primary Examiner* — Matthew W Genack
(74) *Attorney, Agent, or Firm* — Anton J. Hopen; Smith & Hopen, P.A.

(57) ABSTRACT

This invention is a system and method for implementing a VoLTE and circuit switched voice and SMS interworking function to provide voice and SMS service to roaming mobile devices at visiting network based on Circuit-switched (CS) roaming towards VPLMN, and VoLTE voice and SMS roaming towards HPLMN. The interworking function translates CS signaling with VPLMN into IMS signaling towards IMS core at HPLMN. The interworking function also performs location-update registration at HSS at HPLMN for receiving mobile-terminated voice calls and SMS.

20 Claims, 9 Drawing Sheets

INTERWORKING FUNCTION FOR VOLTE OUTBOUND ROAMING

BACKGROUND OF THE INVENTION

1. Field of the Invention

This invention relates generally to the field of Internet Protocol (IP) and telecommunications networks, specifically to interworking of voice over long-term evolution (VoLTE) and circuit-switched (CS) voice and short message service (SMS) in an outbound roaming environment from a mobile operator.

2. Brief Description of the Related Art

Circuit switch (CS) voice is a common technology that provides voice and SMS service to mobile network in a roaming environment. All 2G and 3G networks are using CS to provide voice and SMS service. To use CS for roaming, both visiting and home operators would need to equip with the CS network components (such as MSC, HLR) to provide both mobile-originated (MO) and mobile-terminated (MT) voice calls and SMS.

In 4G environment, a new technology known as "Voice Over LTE (VoLTE)" was invented to provide voice service in a long-term evolution (LTE, "4G") network based on IP Multimedia Subsystem (IMS) technology and infrastructure. Both voice and SMS are supported over IMS.

With VoLTE and the IMS infrastructure, mobile network operators no longer need the CS infrastructure to provide voice and SMS service for their subscribers in the domestic (home) network. Many network operators are planning to shut down their 2G/3G network infrastructure to save the frequency bands for 4G and 5G services, as well as to reduce the operation and maintenance costs.

However, the prerequisite for using VoLTE roaming is that the home operator needs to have VoLTE roaming agreement with the visiting operator. Unfortunately, this is not very common. Many visiting operators either do not have the IMS infrastructure, or they do not want to provide VoLTE roaming to subscribers to protect their voice and SMS roaming revenue. This creates a problem for home operators wishing to implement VoLTE roaming. Thus, these mobile providers cannot shutdown their 3G roaming network infrastructure. A similar problem arises with LTE-only operators who do not have 2G/3G infrastructure, preventing them from providing voice and SMS service to outbound roaming to visiting operators without VoLTE roaming.

In the current state of the art, there is a need for a method and a system for provide an interworking function (IWF) between VoLTE and circuit-switched voice and SMS service for outbound roaming.

SUMMARY OF THE INVENTION

The present invention pertains to an Interworking Function (IWF) for enabling outbound roamers to use circuit-switched voice and SMS service in a Visited Public Land Mobile Network (VPLMN) without the need for VoLTE roaming agreements with a Home Public Land Mobile Network (HPLMN) operators. The IWF behaves as Circuit Switched (CS) roaming toward the VPLMN and behaves as VoLTE roaming toward the HPLMN.

In an embodiment, the IWF includes the following functions: (1) Diameter Routing Agent (DRA) that intercepts and routes Diameter S6a/s6d messages between VPLMN Mobility Management Entity (MME) and HPLMN Home Subscriber Server (HSS); (2) a virtual Home Location Register (vHLR) that provides subscriber registration service to Mobile Switching Center (MSC) in VPLMN; (3) a virtual Mobility Management Entity (vMME) that performs LTE registration to the HSS at HPLMN; (4) a virtual Short Message Service Centre (vSMSC) that receives and routes Mobile-Originated SMS (MO-SMS) from mobile device, and delivers Mobile-Terminate SMS (MT-SMS) to mobile device; (5) a virtual Gateway Mobile Switching Center (vGMSC) that delivers Mobile-Terminated Calls (MT-Call) to user equipment (UE); (6) a Serving Gateway (SGW) that encapsulates IP packets to General Packet Radio Service Tunneling Protocol (GTP) tunnel towards Packet Data Network Gateway (PGW) in HPLMN; (7) a Interconnect Border Control Function (IBCF) that acts as a border controller to Public Switched Telephone Network (PSTN) connection.

In an embodiment, the DRA in the IWF intercepts the diameter Update-Location-Request (ULR) and Update-Location-Answer (ULA) messages between VPLMN Mobility Management Entity (MME) and HPLMN Home Subscriber Server (HSS) during 4G network attachment. The DRA replaces the MME hostname in the ULR message with the hostname of the vMME so that subsequent HSS-initiated messages (such as Cancel-Location-Request) will be received and processed by the vMME.

Upon a 4G Network Attachment, when the vHLR receives a MAP-Update-Location request from MSC/VLR, the vMME builds a Diameter S6a ULR request to HSS. Upon receiving the ULA, the vMME sends a Sh User-Data-Request (UDR) to the HSS to retrieve the Multimedia Telephony (MMTEL) services subscribed by the roamer. These MMTEL services is later used to construct the MAP-Insert-Subscriber-Data requests to the MSC/VLR as a response to the MAP-Update-Location request.

Upon a 3G Network Attachment, when the vHLR receives a MAP-Send-Authentication-Info request from MSC/VLR or Serving GPRS Support Node (SGSN), the vMME builds a Diameter S6a Authentication-Info-Request (AIR) message to HSS for authentication. When the vMME receives the Authentication-Info-Answer (AIA) message, the vHLR sends a MAP-Send-Authentication-Info response to the MSC/VLR or SGSN. When the vHLR receives a MAP-Update-Gprs-Location request from MSC/VLR, the vMME builds a Diameter S6a ULR request to HSS. Upon receiving the ULA, the vMME sends a Sh User-Data-Request (UDR) to the HSS to retrieve the Multimedia Telephony (MMTEL) services subscribed by the roamer. These MMTEL services is later used to construct the MAP-Insert-Subscriber-Data requests to the MSC/VLR as a response to a subsequent MAP-Update-Location request from MSC/VLR.

The vMME instructs the SGW to establish a GTP session with HPLMN PGW for the 'ims' Access Point Name (APN) which will be used to carry VoLTE voice and SMS traffic. Then then vMME instructs the SGW to send a SIP REGISTER request to the IMS core at HPLMN for IMS registration. The IMS core is configured to use the 'Early IMS Authentication' (Ref: 3GPP TS33.978 Section 6.1) which trusts the user traffic from the GTP tunnel and skips the 'Multimedia-Authentication Request/Answer' procedure. Alternately, the SGW of the IWF or the Proxy-Call Session Control Function (P-CSCF) in HPLMN IMS core inserts an 'auth-done' parameter in the SIP REGISTER request so that the Serving Call Session Control Function (S-CSCF) assumes authentication is completed (Ref: 3GPP TS24.229 section 5.4.1.2.2E).

Mobile-Originated (MO) voice call from mobile device is realized by the VPLMN MSC that receives the CS Call setup request from UE, and break-out to its PSTN provider. This follows the standard procedure of a MO voice call in a CS roaming situation. HPLMN is not involved unless Customized Applications for Mobile networks Enhanced Logic (CAMEL) trigger is activated at the visiting MSC.

Mobile-terminated (MT) voice toward the UE can be provided in the following manner: (1) MT call arrives at the HPLMN IMS core where the subscriber is IMS-registered. The IMS core routes the SIP INVITE to the UE (where its Contact header was previously registered in IMS core during IMS registration) via the PGW, SGW and vGMSC. (2) The vGMSC interrogates the vHLR with a MAP-Send-Routing-Info (SRI). (3) The vHLR interrogates the VPLMN MSC with a MAP-Provide-Roaming-Number (PRN) for the Mobile Station Roaming Number (MSRN). (4) With the MSRN receives from MSC, the vGMSC routes the call to the PSTN with the called party number (SIP request-URI and 'To' header) being the MSRN. (5) The call arrives at the VPLMN MSC (who assigned the MSRN number) who further routes the call to the UE with a CS Call Setup.

Mobile-Originated (MO) SMS is realized by: (1) The VPLMN MSC who receives the SMS submit request from UE via the Radio Access Network (RAN), and forwards the request to the vSMSC via MAP-MO-Forward-SM (MO-FSM). (2) The vSMSC converts the request into a SIP MESSAGE and routes it to the SGW, PGW, HPLMN IMS Core and IP Short Message Gateway (IPSMGW) in the Telephony Application Server (TAS). (3) The IPSMGW routes the SMS request to the local SMSC or SMS Gateway for delivery to the recipient.

Mobile-Terminated (MT) SMS is realized by: (1) The IPSMGW in the HPLMN receives the MT-SMS, and routes it to the IMS Core in a form of SIP MESSAGE request. (2) The IMS core routes the SIP MESSAGE request to the UE (where its Contact header was previously registered in the IMS core during IMS registration) via the PGW, SGW and vSMSC. (3) The vSMSC send a MAP-Send-Routing-Info-For-SM (SRI-SM) to the vHLR who replies with the VPLMN MSC address. (4) The vSMSC converts the SMS request into a MAP-MT-ForwardSM (MT-FSM) and sends it to the MSC. (5) The MSC delivers the SMS to the UE via the Radio Access Network (RAN).

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized, and changes may be made without departing from the scope of the invention.

Figure 1:
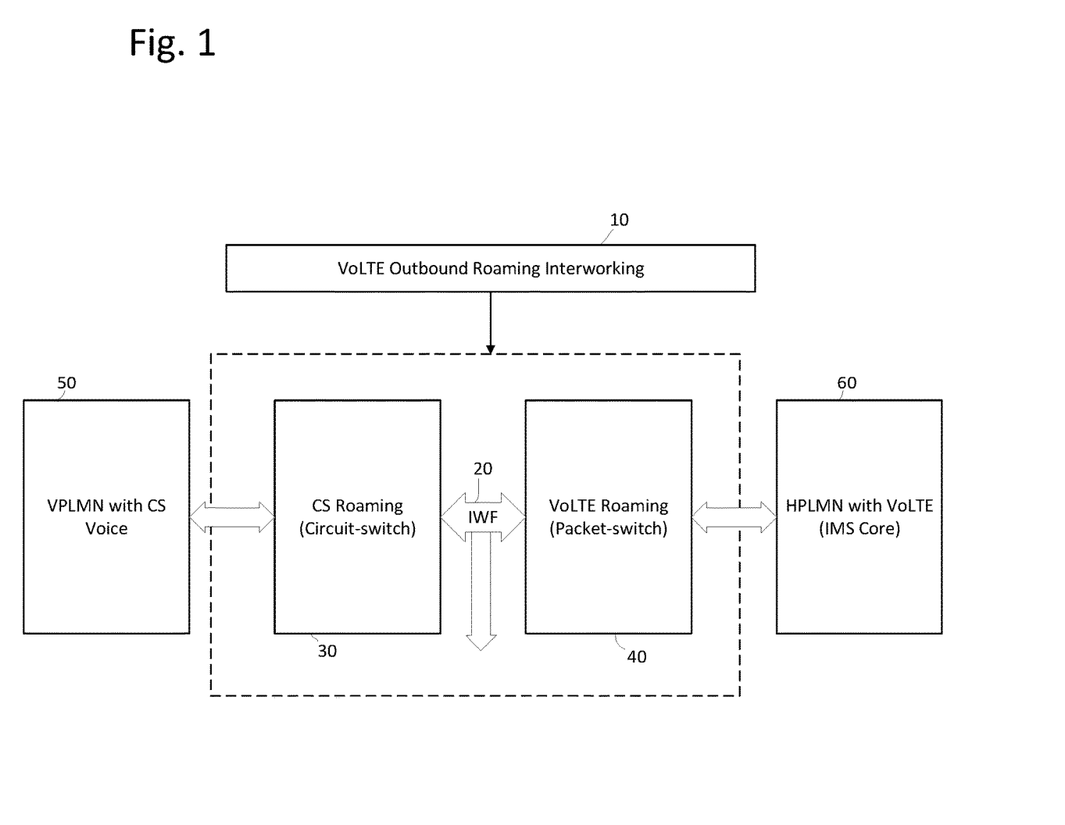
FIG. 1 is a block diagram schematically depicting the conceptual architecture of the VoLTE Outbound Roaming Interworking Function (IWF). The IWF acts as a Circuit-Switched (CS) voice/SMS roaming towards VPLMN and Packet-Switched (PS) VoLTE roaming towards HPLMN.

FIG. 1 provides a schematic depiction of an embodiment of the invention. An Interworking Function (IWF) 10 is deployed between a Visited Public Land Mobile Network (VPLMN) 50 and a Home Public Land Mobile Network (HPLMN) 60. VPLMN 50 is a Circuit-Switched (CS) network—e.g., 2G, 3G network where the HPLMN 60 is a Packet-Switched (PS) network e.g. 4G Long Term Evolution (LTE) or 5G network. In the current state of the art, the HPLMN with a LTE only network does not have the infrastructure or capability to do CS roaming, and thus VoLTE roaming is mandatory. A major limitation of VoLTE roaming is that VPLMN and HPLMN must have a preexisting agreement with one another, making it impractical for many network providers.

In an embodiment, the present invention addresses this problem by providing IWF 20 in communication with both VPLMN 50 and HPLMN 60. IWF 20 enables HPLMN 60 to provide voice and SMS roaming services to a subscriber roaming in VPLMN 50 without requiring HPLMN 60 to have CS capability or a VoLTE roaming agreement with VPLMN 50.

IWF 20 has a virtual Home Location Register (HLR) and virtual GMSC and SMSC that behaves like CS roaming toward VPLMN 50. IWF 20 also has a virtual Mobile Management Entity (MME) for LTE roaming toward HPLMN 60. The IMS Core in HPLMN 60 is utilized to receive mobile-terminated (MT) MT-voice and MT-SMS, and routes the requests to the IWF 20, into CS roaming 30 to reach the UE roaming in VPLMN 50.

Figure 2:
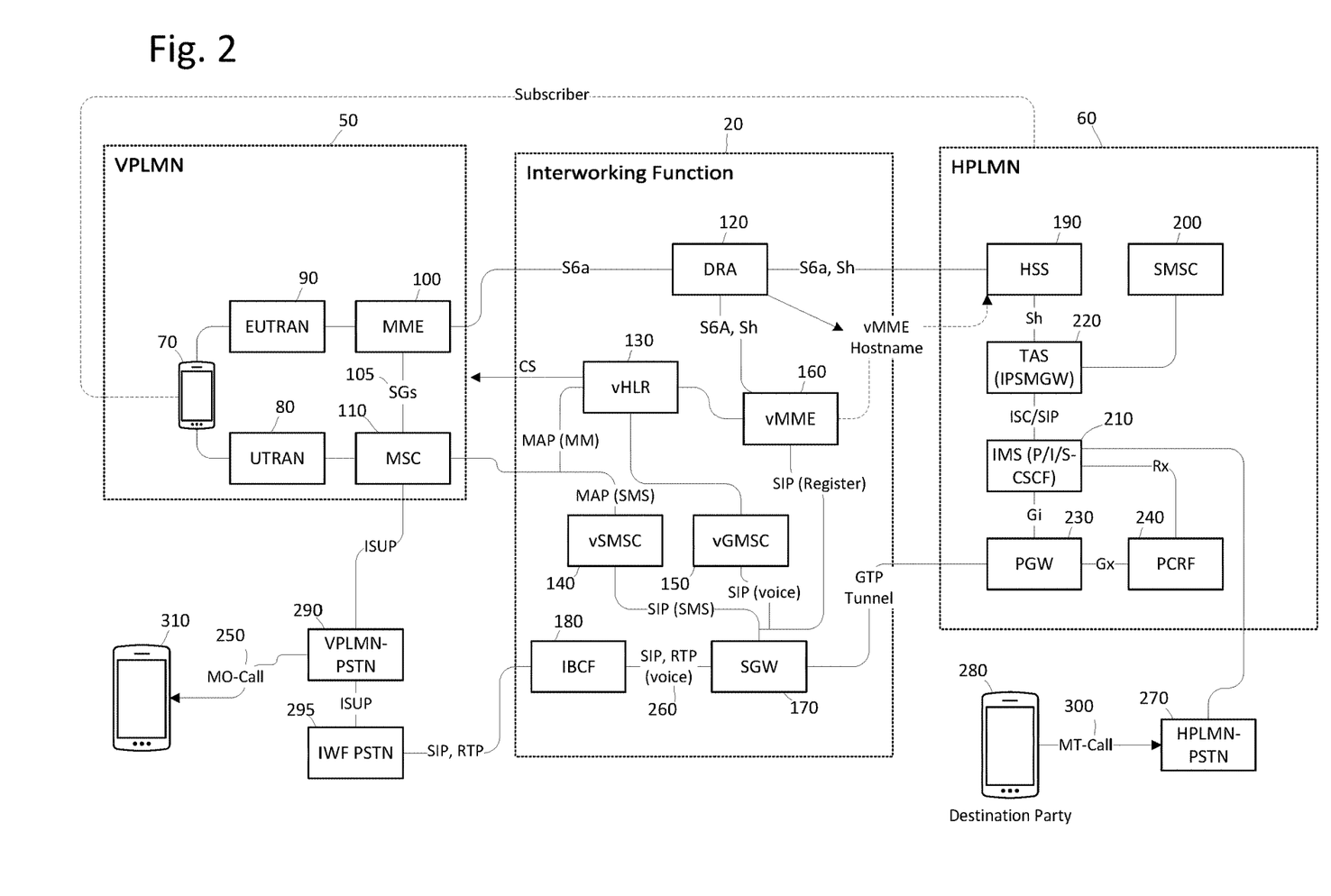
FIG. 2 is a block diagram schematically depicting the system architecture of the IWF.

FIG. 2 depicts a roaming User Equipment (UE) 70 establishing a connection to UTRAN 80 or EUTRAN 90 of VPLMN 50. UE 70 is a subscriber of HPLMN 60 roaming in VPLMN 50. As explained above VPLMN 50 is a 3G CS network or 4G network supporting CS fallback. VPLMN 50 comprises the following components: a UTRAN 80 (for 3G), EUTRAN 90 (for 4G), a Mobility Management Entity (MME) 100 and a Mobile Switching Center (MSC) 110.

Next, IWF 20 comprising a Diameter Routing Agent (DRA) 120, a virtual Home Location Register (vHLR) 130, a virtual Short Message Service Center (vSMSC) 140, a virtual Gateway Mobile Switching Center (GMSC) 150, a virtual Mobility Management Entity (vMME) 160, a Serving Gateway (SGW) 170 and an Interconnect Border Control Function (IBCF) 180.

HPLMN 60 comprises a Home Subscriber Server (HSS) 190, a Short Message Service Center (SMSC) 200, an IP Multimedia Subsystem (IMS) core 210, a Telephony Application Server (TAS) 220, a Packet Data Network Gateway (PGW) 230, and a Policy and Charging Rules Function (PCRF) 240. The IMS core 210 comprises a Proxy-Call Session Control Function (P-CSCF), an Interrogating-Call Session Control Function (I-CSCF), and a Serving-Call Session Control Function (S-CSCF), collectively designated P/I/S-CSCF.

IWF 20 communicates with both VPLMN 50 and HPLMN 60. DRA 120 of IWF 20 is communicatively connected to MME 100 of VPLMN 50 and HSS 190 of HPLMN 60 over s6a interface. DRA 120 is configured to intercept Update-Location-Request (ULR) and/or Update-Location-Answer (ULA) messages exchanged between MME 100 and HSS 190. DRA 120 can be configured to mediate the intercepted ULR/ULA messages. The DRA 120 mediates the ULR message in a manner that the vMME 160 (instead of the VPLMN MME 100) hostname is stored in the HSS 190.

vHLR 130 of IWF 20 communicates with MSC 110 of VPLMN 50 using Mobile Application Part (MAP) protocol. IWF 20 uses vHLR 130 to establish a Circuit Switched (CS) connection with VPLMN 50. This is accomplished by the MSC/VLR triggering a MAP-Location-Update procedure with vHLR 130 to update a Global Title (GT) address of MSC/VLR in vHLR 130 so that in subsequent Mobile-Terminated (MT) voice calls and SMS messages, vHLR 130 will return the GT of MSC/VLR for UE.

SGW 170 of IWF 20 enables a GPRS Tunneling Protocol (GTP) connection with HPLMN PGW 230 which is connected to the IMS Core 210 and PCRF. In this manner, UE 310 is able to make a mobile-originated (MO) voice call 250 with CS technologies, and IWF 20 translates it into Packet-Switch SIP/RTP 260 via SGW 170, PGW 230, and IMS Core 210. The IMS Core 210 breaks-out the MO voice-call 250 to PSTN 270 to reach the destination party 280.

SGW 170 of IWF 20 bridges MT-call 300 to its PSTN 290 via an Interconnect Border Control Function (IBCF) 180, thereby enabling MT-voice roaming service for the UE.

MSC 110 of VPLMN 50 and the vSMSC 140 of IWF 20 are connected via MAP/SS7. This connection enables VPLMN 50 to use CS-based SMS submit and delivery technology to provide MO and MT SMS roaming service to UE.

Network Attachment

Figure 3:
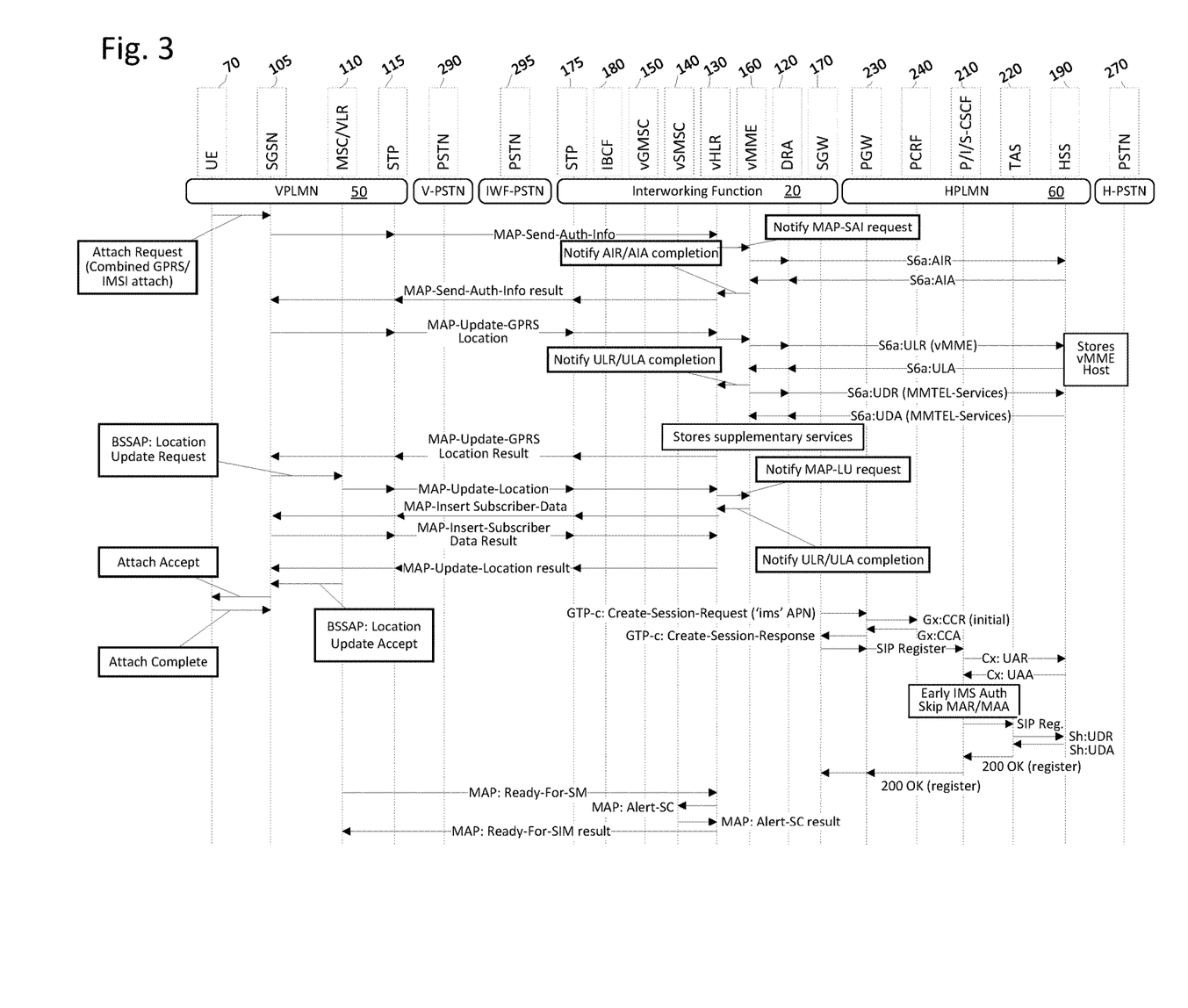
FIG. 3 is a signaling diagram schematically depicting the callflow for 3G network attachment in VPLMN.

FIG. 3 depict signaling flows for 3G network attachment using IWF 20. UE 70 submits a network attach request to the SGSN 105 in VPLMN 50, which triggers a MAP-Send-Auth-Info request to the vHLR 130. The vHLR 130 and vMME 160 translates it into a Diameter s6a Authentication-Info-Request (AIR) to the HSS 190. The HSS 190 replies with an Authentication-Info-Answer (AIA). The vMME 160 and vHLR 130 translates it to a MAP-Send-Auth-Info result to the SGSN 105.

Next, the SGSN 105 sends a MAP-Update-Gprs-Location request to the vHLR 130. The vHLR 130 and vMME 160 translates it into a Diameter s6a Update-Location-Request (ULR) to the HSS 190. The HSS 190 replies with an Update-Location-Answer (ULA). The vMME 160 and vHLR 130 translates it to a MAP-Update-Gprs-Location result to the SGSN 105.

Next, the vMME 160 sends a Diameter Sh User-Data-Request (UDR) to the HSS 190 to retrieve the subscriber's MMTEL telephony service subscription. The HSS 190 replies with a User-Data-Answer (UDA) with the MMTEL service subscription such as call forward and call barring. Such information is stored in the IWF 20 for constructing the Insert-Subscriber-Data request to the VPLMN 50 MSC 110.

Next, the MSC/VLR 110 in VPLMN 50 sends a MAP-Update-Location request to the vHLR 130. The vHLR 130 send a MAP-Insert-Subscriber-Data request to the MSC/VLR 110 with the MMTEL service subscription retrieved from HSS 190 in the previous step. The MSC/VLR 110 replies with MAP-Insert-Subscriber-Data result and the vHLR 130 sends an MAP-Update-Location result to the MSC/VLR 110 to complete the network registration to the UE 70.

Next, the IWF 20 triggers its SGW 170 to establish a Packet Data Protocol (PDP) context and GTP tunnel for 'ims' APN by sending a GTP-C Create-Session-Request. This GTP tunnel is used to carry the voice and SMS traffic later. The PGW 230 sends a Gx Credit-Control-request (CCR) to the PCRF 240 who replies with Credit-Control-Answer (CCA). The PGW 230 send a GTP-C Create-Session-Response to the SGW 170 and PDP context setup is completed.

Next, the IWF 20 triggers SGW 170 to send a SIP REGISTER request to the IMS core via PGW 230 to register a virtual UE in the IMS domain. This registration is needed so that the IMS core will route MT-voice and SMS to the virtual UE via the PGW 230 and SGW 170. The IMS core authorizes the subscriber registration by sending a Cx User-Authorization-Request (UAR) to the HSS 190, who replies with a User-Authorization-Answer (UAA). In the embodiment in FIG. 3, the IMS core performs an 'Early IMS Authentication' by trusting the SIP REGISTER request from the IWF 20 SGW 170. The IWF 20 triggers the Telephony Application Server (TAS) 220 to retrieve subscriber MMTEL profile using Sh User-Data-Request/Answer (UDR/UDA). The SIP registration is completed by the IMS core sending a 200 OK to the SGW 170.

In another embodiment, the SGW 170 of the IWF 20 or the P-CSCF 210 of the HPLMN 60 IMS core inserts an 'auth-done' parameter in the SIP REGISTER request so that the Serving Call Session Control Function (S-CSCF) 210 assumes authentication is completed.

Figure 4:
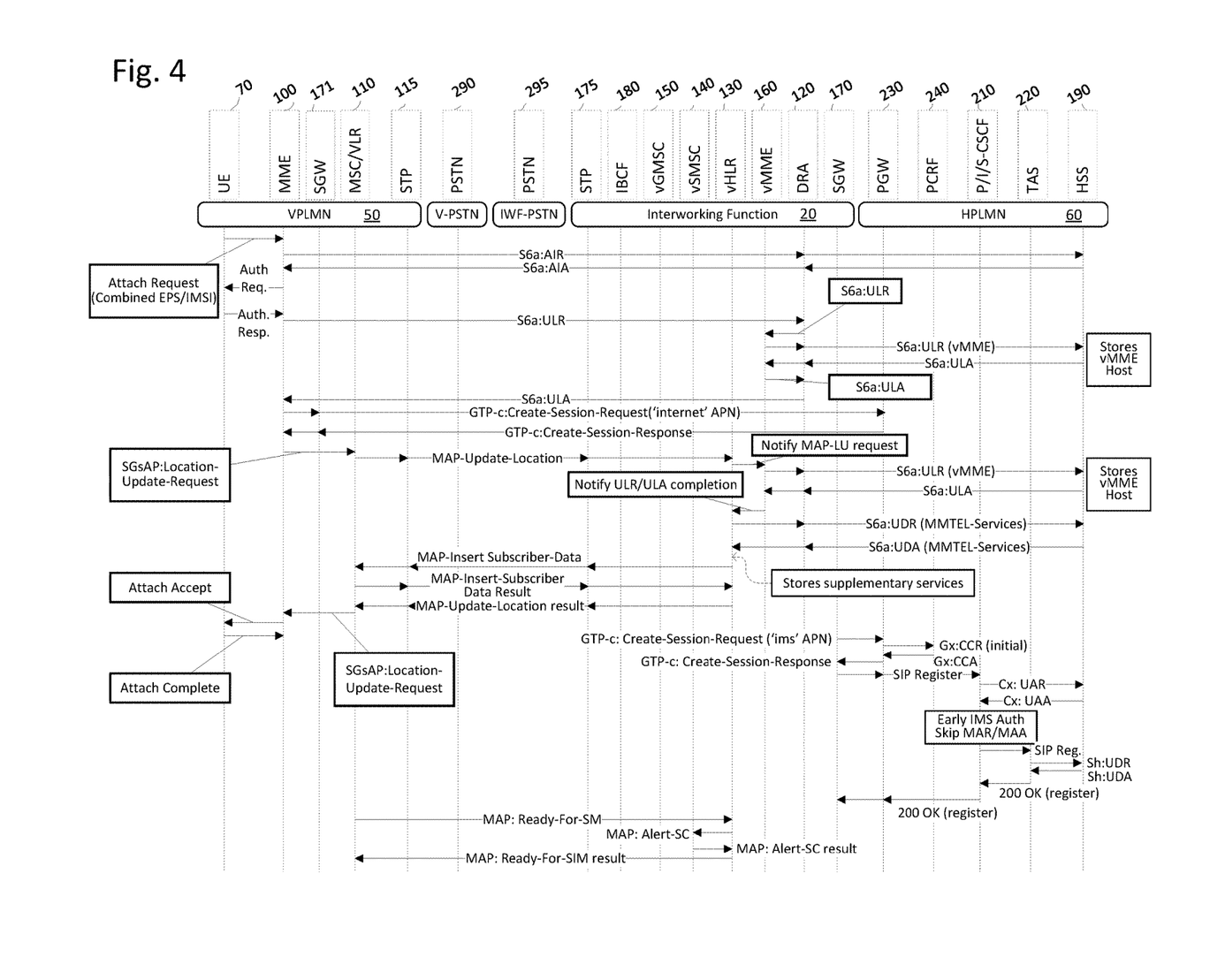
FIG. 4 is a signaling diagram schematically depicting the callflow for 4G network attachment in VPLMN.

FIG. 4 depict signaling flows for 4G network attachment using IWF 20. UE 70 submits a network attach request (for combined EPS/IMSI attachment) to the MME 100 in VPLMN 50, which triggers a Diameter s6a Authentication-Info-Request (AIR) to the HSS 190. This request is intercepted by the DRA 120 in IWF 20. The HSS 190 replies with an Authentication-Info-Answer (AIA).

Next, the MME 100 sends a Diameter s6a Update-Location-Request (ULR) to the HSS 190. This request is intercepted by the DRA 120 in IWF 20. The DRA 120 mediates the request to replace the MME 100 hostname with the vMME 160 hostname so that subsequent HSS-initiated requests (such as Cancel-Location) will reach the vMME 160. The HSS 190 replies with an Update-Location-Answer (ULA).

Next, the MME 100 triggers its SGW 171 to establish a Packet Data Protocol (PDP) context and GTP tunnel for the default internet-access APN by sending a GTP-C Create-Session-Request. This GTP tunnel is used to carry internet traffic and is not related to voice or SMS.

Next, following the combined EPS/IMSI attachment procedure, the MME 100 triggers its MSC 110 to send a MAP-Update-Location request to the vHLR 130. The vHLR/vMME translates it into a Diameter s6a Update-Location-Request (ULR) to the HSS 190. The HSS 190 replies with an Update-Location-Answer (ULA).

Next, the vMME 160 sends a Diameter Sh User-Data-Request (UDR) to the HSS 190 to retrieve the subscriber's MMTEL telephony service subscription. The HSS 190 replies with a User-Data-Answer (UDA) with the MMTEL service subscription such as call forward and call barring. Such information is stored in the IWF 20 for constructing the Insert-Subscriber-Data request to the VPLMN MSC 110.

Next, the vHLR 130 sends a MAP-Insert-Subscriber-Data request to the MSC/VLR 110 with the MMTEL service subscription retrieved from HSS 190 in the previous step. The MSC/VLR 110 replies with MAP-Insert-Subscriber-Data result and the vHLR 130 sends an MAP-Update-Location result to the MSC/VLR 110 to complete the network registration to the UE 70.

Next, the IWF 20 triggers its SGW 170 to establish a Packet Data Protocol (PDP) context and GTP tunnel for 'ims' APN by sending a GTP-C Create-Session-Request. This GTP tunnel is used to carry the voice and SMS traffic later. The PGW 230 sends a Gx Credit-Control-request (CCR) to the PCRF 240 who replies with Credit-Control-Answer (CCA). The PGW 230 send a GTP-C Create-Session-Response to the SGW 170 and PDP context setup is completed.

Next, the IWF 20 triggers SGW 170 to send a SIP REGISTER request to the IMS core via PGW 230 to register a virtual UE in the IMS domain. This registration is needed so that the IMS core will route MT-voice and SMS to the virtual UE via the PGW 230 and SGW 170. The IMS core authorizes the subscriber registration by sending a Cx User-Authorization-Request (UAR) to the HSS 190, who replies with a User-Authorization-Answer (UAA). In the embodiment in FIG. 3, the IMS core performs an 'Early IMS Authentication' by trusting the SIP REGISTER request from the IWF 20 SGW 170. The IWF 20 triggers the TAS 220 to retrieve subscriber MMTEL profile using Sh User-Data-Request/Answer (UDR/UDA). The SIP registration is completed by the IMS core sending a 200 OK to the SGW 170.

In another embodiment, the SGW 170 of the IWF 20 or the P-CSCF 210 of the HPLMN 60 IMS core inserts an 'auth-done' parameter in the SIP REGISTER request so that the Serving Call Session Control Function (S-CSCF) 210 assumes authentication is completed.

MO-Voice Service

Figure 5:
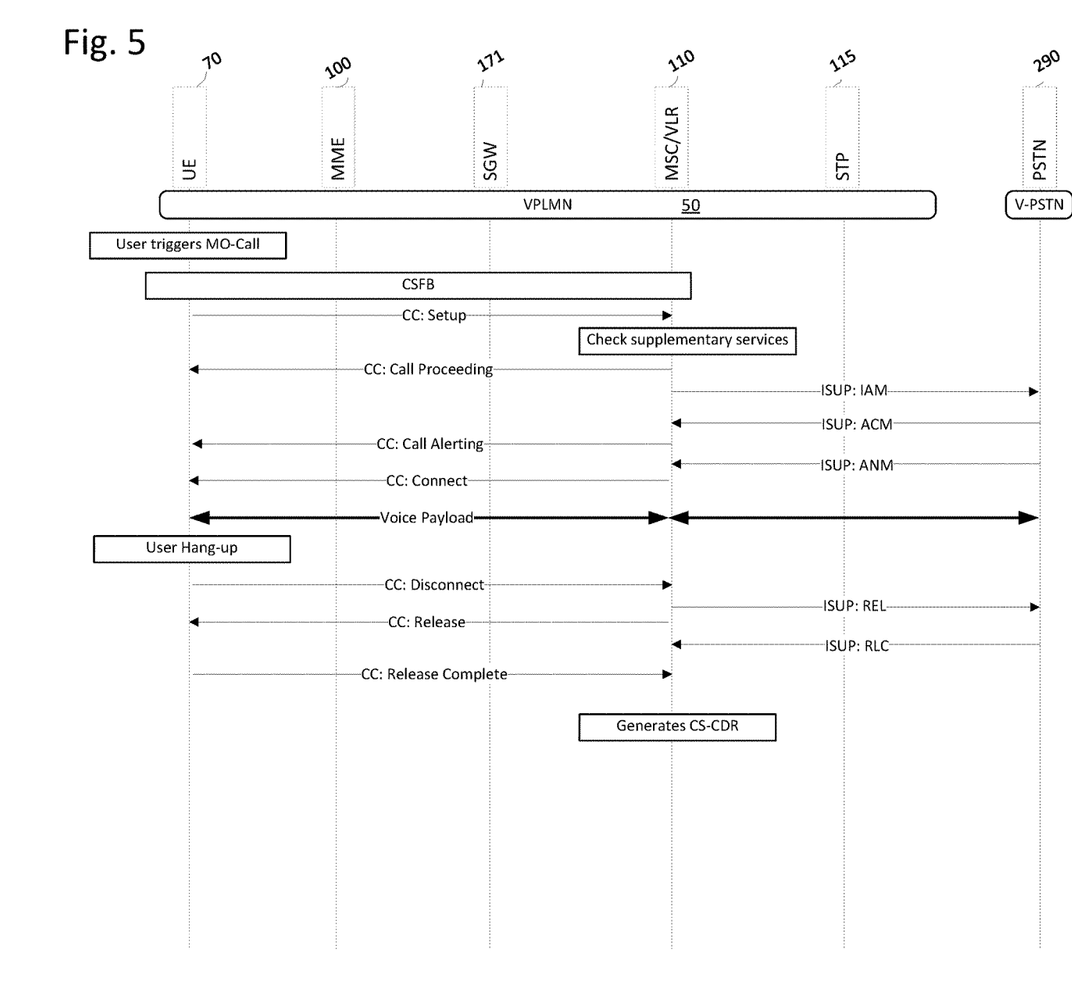
FIG. 5 is a signaling diagram schematically depicting the callflow for MO-voice service using the IWF.

FIG. 5 depicts a signaling diagram for a Mobile-Originated (MO) voice call from UE 70. UE 70 sends a Call Control (CC) Setup to MSC 100, who replied with CC Call Proceeding, and checks for supplementary service (such as call barring). The MSC 110 breaks out the call by sending an ISDN User Part (ISUP) Initial Address Message (IAM) to the PSTN 290, who answers with Address Complete Message (ACM). The MSC 110 sends a CC Call Alerting to the UE 70. The call is routed to the destination and the PSTN 290 replies with an ISUP Answer Message (ANM). The MSC 110 sends a CC Connect to the UE 70.

MO-call is dropped when the UE 70 sends a CC Disconnect to the MSC 110, which sends an ISUP Release (REL) to the PSTN 290 and replies to UE 70 with a CC Release signal. The disconnect signal reaches the destination party. PSTN 290 replies with an ISUP Release Complete (RLC), and the MSC 110 sends a CC Release Complete to the UE 70. The MSC 110 generates CDR for billing.

Normally, the entire signaling flow happens in the VPLMN 50 and HPLMN is not involved, when an exception when Customized Applications for Mobile networks Enhanced Logic (CAMEL) triggers is activated in the MSC 110 for the subscriber.

MT-Voice Service

Figure 6A:
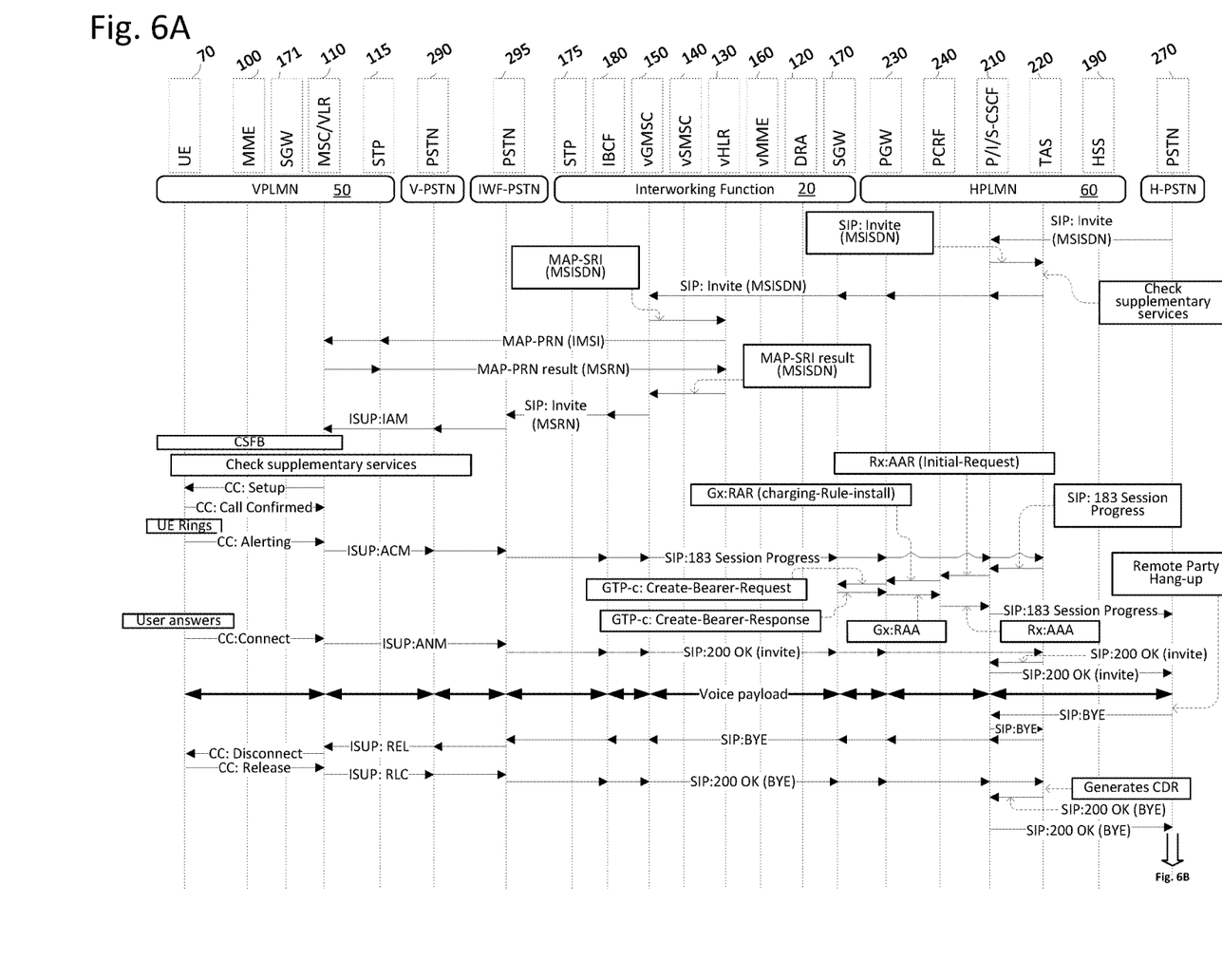
FIGS. 6A-6B are signaling diagrams schematically depicting the callflow for MT-voice service using the IWF.
Figure 6B:
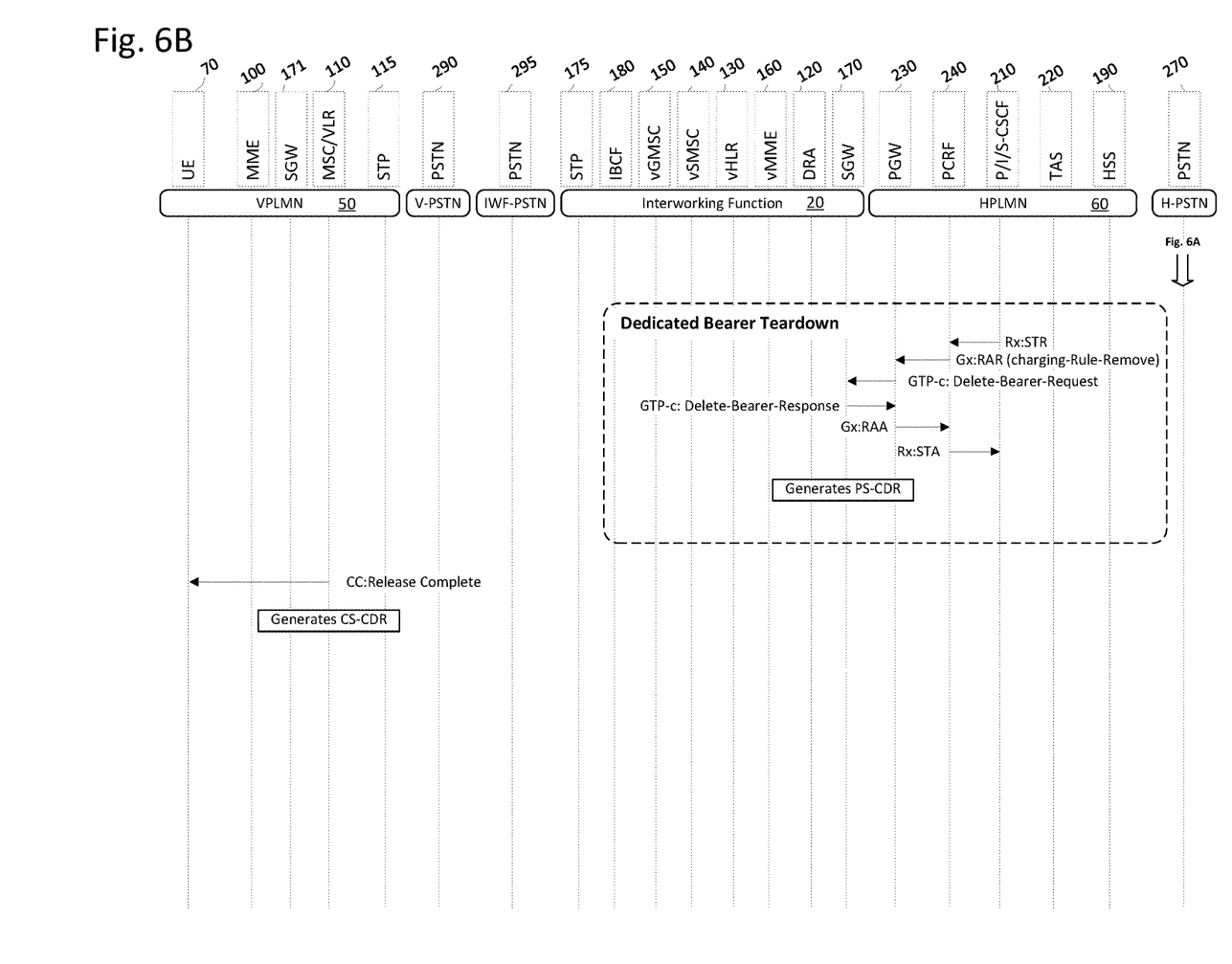

FIG. 6 depicts a signaling diagram for a Mobile-Terminated (MT) voice call toward UE 70. MT call arrives at the HPLMN 60 IMS core where the subscriber is IMS-registered. The IMS core routes the SIP INVITE to the UE (where its Contact header was previously registered in IMS core during IMS registration) via the PGW 230, SGW 170 and vGMSC 150. The vGMSC 150 interrogates the vHLR 130 with a MAP-Send-Routing-Info (SRI). The vHLR 130 interrogates the VPLMN 50 MSC 110 with a MAP-Provide-Roaming-Number (PRN) for the Mobile Station Roaming Number (MSRN). When the MSRN receives from MSC 110, the vGMSC 150 routes the call (SIP INVITE) to the PSTN 295 with the called party number (SIP request-URI and 'To' header) being the MSRN. The PSTN 295 translates the SIP call into a CS call. The CS call arrives at the VPLMN 50 MSC 110 (who assigned the MSRN number) who further routes the call to the UE 70 with a CC Setup. The UE 70 replies with a CC Call Confirmed, followed by a CC Alerting. The MSC 110 sends an ISUP Address Complete (ACM) to the PSTN 295. The IBCF/vGMSC (180/150) receives the SIP 183 Session Progress and is populated to the SGW 170, PGW 230, IMS core and TAS 220. The P-CSCF 210 of the IMS core triggers the PCRF 240 to establish a dedicated bearer by sending a Rx AA-Request (AAR), and the PCRF 240 send a Gx Re-Auth-Request (RAR) to the PGW 230. The PGW 230 completes the dedicated bearer setup by sending a GTP-C Create-Bearer-Request to the SGW 170, who replies with Create-Bearer-Response, PGW 230 replies with Gx Re-Auth-Answer (RAR), PCRF 240 replies with Rx AA-Answer (AAA).

When the user answers the call on the UE 70, it sends a CC Connect to the MSC 110, who translates it into an ISUP Answer Message (ANM) to the PSTN 295. The PSTN 295 sends a SIP 200 OK to the IBCF/vGMSC (180/150), which populates to the SGW 170, PGW 230, IMS core and TAS 220.

The voice payload is bridged at UE 70, MSC 110, PSTN, IBCF, vGMSC, SGW 170, PGW 230, P-CSCF (of the IMS core) 210 and HPLMN PSTN 270.

In the embodiment, the remote party disconnect the call by the PSTN 270 sending a SIP BYE, which populates to the IMS core, TAS 220, PGW 230, SGW 170, vGMSC 150, IBCF 180 and PSTN 295. The PSTN 295 send an ISUP Release (REL) to the MSC 110, who sends a CC Disconnect signal to the UE 70. The UE 70 replies with a CC Release, and the MSC 110 send an ISUP Release Complete (RLC) to the PSTN 295. The PSTN 295 sends a SIP 200 OK to the IBCF/vGMSC, which populates to the SGW 170, PGW 230, IMS core and TAS 220. The dedicated bearer is torn down by the GTP-C Delete-Bearer-Request between SGW 170 and PGW 230, Gx Re-Auth-Request/Answer (RAR/RAA) between PGW 230 and PCRF 240, and Rx Session-Termination-Request/Answer (STR/STA) between the PCRF 240 and P-CSCF 210 of the IMS-core. The MSC generates CS-based CDR for billing. The SGW 170 also generates PS-based CDR for billing.

MO SMS

Figure 7:
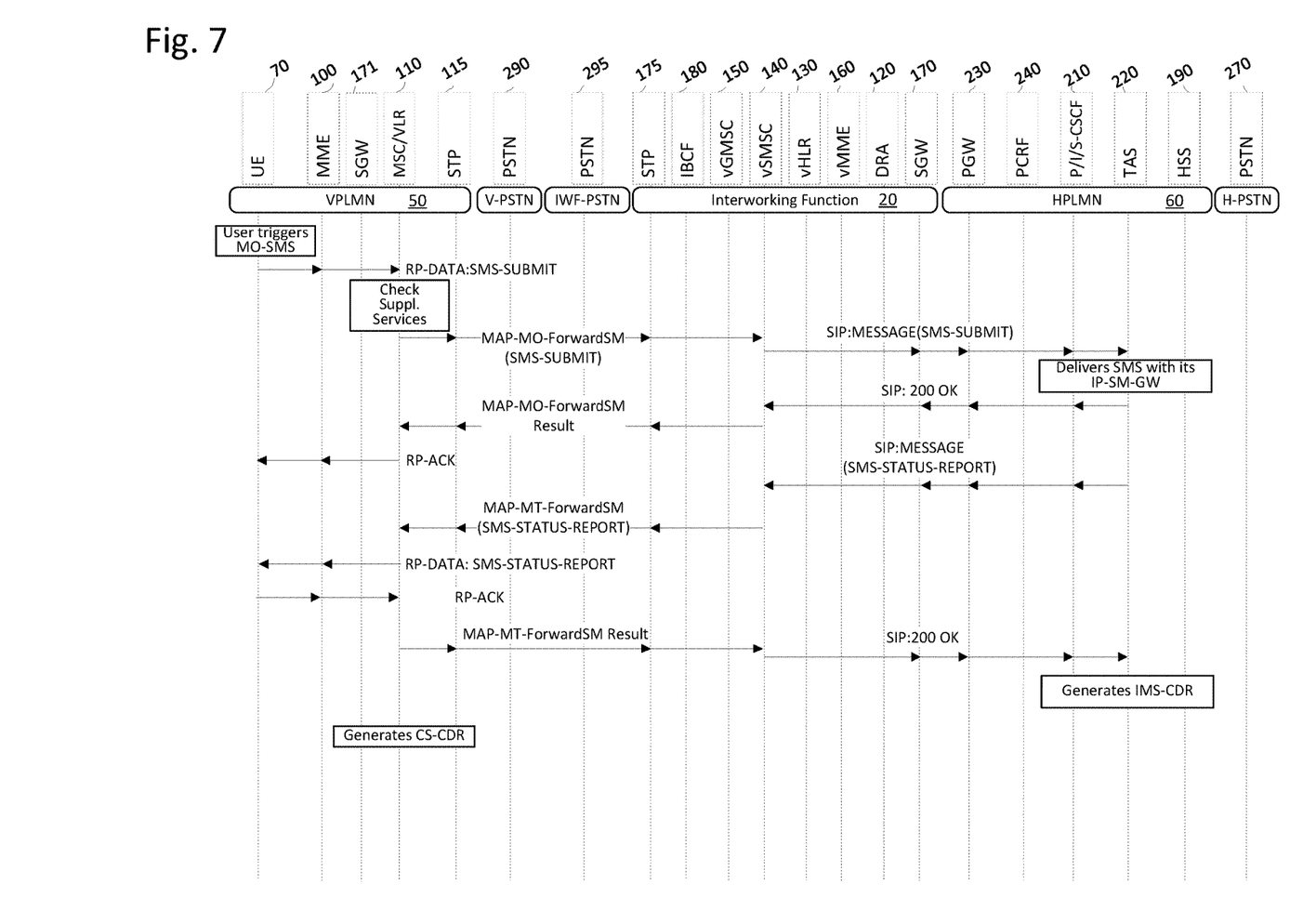
FIG. 7 is a signaling diagram schematically depicting the callflow for MO-SMS service using the IWF.

FIG. 7 depicts how Mobile-Originated (MO) SMS can be realized. The UE 70 send a RP-DATA for SMS-SUBMIT to the MSC 110, who checks for the supplementary service (such as call barring), and sends MAP-MO-Forward-SM (MO-FSM) to the vSMSC 140. The vSMSC 140 converts the request into a SIP MESSAGE and routes it to the SGW 230, PGW 230, HPLMN IMS Core and IP Short Message Gateway (IPSMGW) in the TAS 220. The IPSMGW routes the SMS request to the local SMSC or SMS Gateway for delivery to the recipient.

When the SMS is delivered successfully or failed, the IPSMGW sends a SIP MESSAGE for SMS-STATUS-REPORT to the IMS Core, PGW 230, SGW 170 and vSMSC 140. The vSMSC 140 translates it into a MAP-MT-ForwardSM to the MSC 110, which sends a RP-DATA for SM-STATUS-REPORT to the UE 70. The UE 70 replies with RP-ACK to the MSC 110, which sends a MAP-MT- ForwardSM result to the vSMSC 140. The vSMSC 140 translates it into a SIP 200 OK and sends it to the SGW 170, PGW 230, IMS core and TAS 220.

Figure 8:
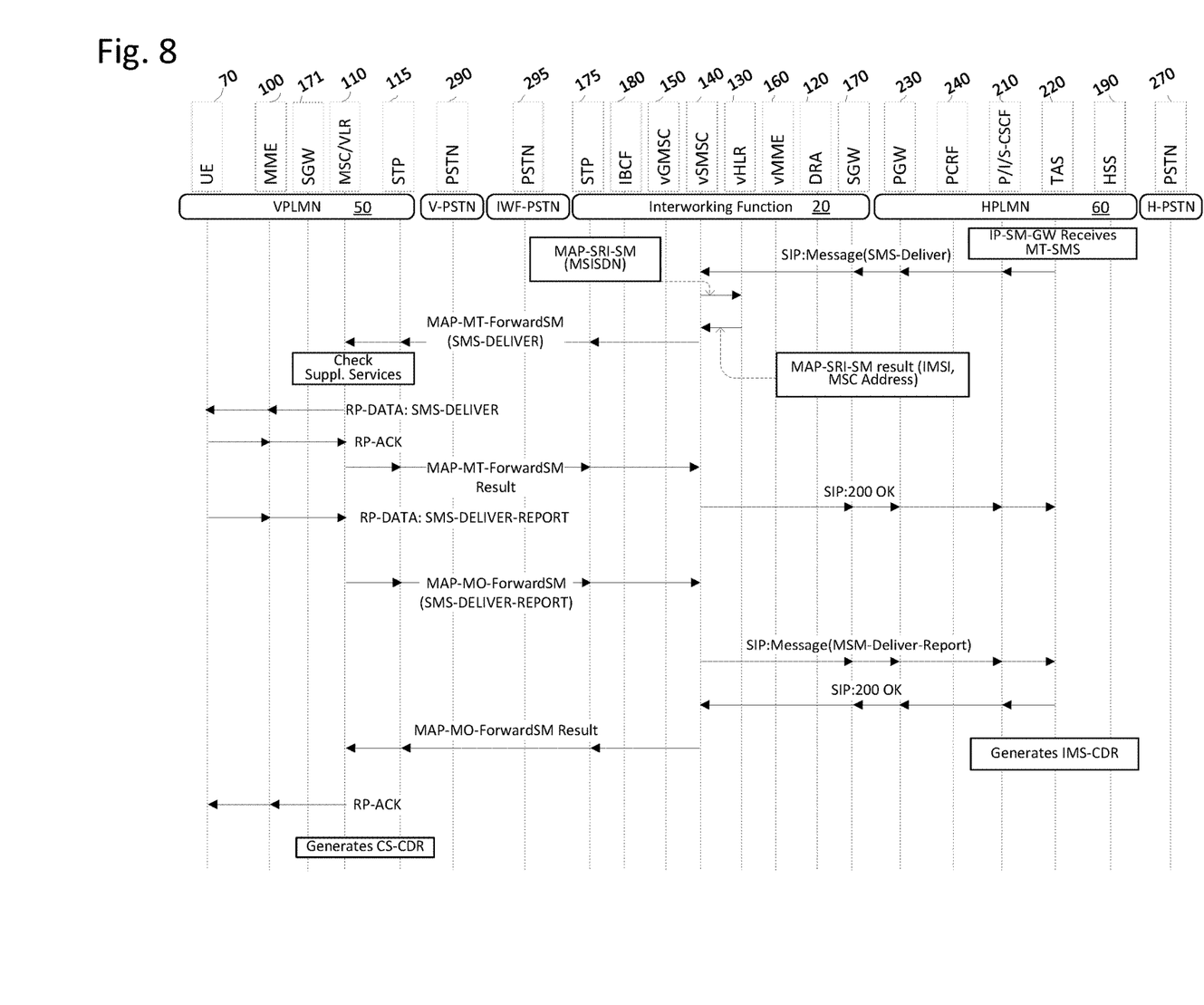
FIG. 8 is a signaling diagram schematically depicting the callflow for MT-SMS service using the IWF.

FIG. 8 depicts how Mobile-Terminated (MT) SMS can be realized. The IPSMGW in the HPLMN 60 receives the MT-SMS, and routes it to the IMS Core in a form of SIP MESSAGE request. The IMS core routes the SIP MESSAGE request to the UE 70 (where its Contact header was previously registered in the IMS core during IMS registration) via the PGW 230, SGW 170 and vSMSC 140. The vSMSC 140 sends a MAP-Send-Routing-Info-For-SM (SRI-SM) to the vHLR 130 who replies with the VPLMN MSC 110 address. The vSMSC 140 converts the SMS request into a MAP-MT-ForwardSM (MT-FSM) and sends it to the MSC 110. The MSC 110 delivers the SMS to the UE 70 by sending a RP-DATA SMS-DELIVER.

If SMS delivery report is enabled, the UE 70 sends a RP-DATA for SMS-DELIVER-REPORT to the MSC 110, who sends MAP-MO-Forward-SM (MO-FSM) to the vSMSC 140. The vSMSC 140 converts the request into a SIP MESSAGE and routes it to the SGW 170, PGW 230, HPLMN IMS Core and IP Short Message Gateway (IP-SMGW) in the TAS 220. The TAS 220 replies with a SIP 200 OK to the IMS core, PGW 230, SGW 170 and vSMSC 140. The vSMSC 140 translates it into a MAP-MO-ForwardSM result, and sends it to the MSC 110. The MSC 110 sends a RP-ACK to the UE 70.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICSE, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Terms

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Application Function (AF) is a logical element of the 3GPP policy and charging control (PCC) framework which provides session related information to the policy and charging rules function (PCRF) in support of PCC rule generation.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Diameter is an authentication, authorization, and accounting protocol for computer networks.

Diameter Routing Agent (DRA) is an element in a 3G or 4G (such as LTE) network that enables real-time routing capabilities so that messages are routed among the correct elements in a network. The DRA was launched by the 3GPP to address the increased Diameter signaling traffic and growing sophistication of 4G LTE networks.

Evolved Node B (eNB or eNodeB) is a base station terminating the air interface on the network side. It is responsible for all radio resource management. It is also responsible for allocation of user traffic to the downlink/uplink, security and relaying of higher layer NAS (Non-Access Stratum) signaling to the MME.

Evolved Universal Terrestrial Radio Access Network (EUTRAN) is the radio (air interface) access architecture for LTE.

Fully Qualified Domain Name (FQDN) is a domain name that specifies its exact location in the tree hierarchy of the Domain Name System (DNS).

Gateway Mobile Switching Center (GMSC) is a function within a PLMN (Public Land Mobile Network). GMSC terminates the PSTN (Public Switched Telephone Network) signaling and traffic formats. It converts this to protocols used in mobile networks. For mobile terminated calls, GMSC interacts with the HLR (Home Location Register) to retrieve routing information.

General Packet Radio Service (GPRS) is a packet oriented mobile data standard on the 2G and 3G cellular communication network's global system for mobile communications (GSM).

GPRS Tunneling Protocol (GTP) is defined by 3GPP standards to carry General

Packet Radio Service (GPRS) within 3G/4G networks.

HLR means Home Location Register which is a database that contains subscription data about subscribers authorized to use the GSM core network. The HLRs store details of every SIM card issued by the mobile phone operator.

Home Public Land Mobile Network (HPLMN) means the network in which a mobile subscriber's profile is held. Mobile users that roam on other networks (visiting) receive subscription information from the HPLMN.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Inbound Roaming means a subscriber of another network "visits" within the local (home) network but is able to use the local network to makes calls, send messages and the like. The inbound roaming service allows subscribers from other operators to access the local network and services.

Interconnect Border Control Function (IBCF) is a boundary control between various service provider networks, providing IMS network security in terms of signaling information. It enables communication between IPv4 and IPv6 SIP applications, controlling transport plane functions, network topology hiding, screening of SIP signaling, selecting an optimum signaling interconnect, and creation of charging data records.

Interrogating Call Session Control Function (I-CSCF) is responsible for onward routing of SIP messages to the appropriate S-CSCF (Serving CSCF) for a given subscriber. It is a key element in the IMS roaming methodology.

IP Short Message Gateway (IPSMGW) is an IMS application server handling SIP based messaging services for IMS subscribers.

Long-Term Evolution (LTE) is a standard for wireless broadband communication for mobile devices and data terminals, based on the GSM/EDGE and UMTS/HSPA technologies.

Media Gateway (MGW) handles the media plane (voice) in a distributed switch.

Media Gateway Control Function (MGCF) facilitates call control, interfacing the PS domain to the circuit switched domain when interworking between the IMS and PSTN is necessary.

Mobile application part (MAP) is an SS7 protocol used to access the home location register (HLR), visitor location register (VLR), mobile switching center and other components of a mobile network infrastructure.

Mobile Switching Center (MSC) means the primary service delivery node for GSM/CDMA, responsible for routing voice calls and SMS as well as other services. The MSC connects and releases end-to-end connections, administers mobility and hand-over requirements during the call and oversees charging and real-time prepaid account monitoring.

Mobility Management Entity (MME) is a component standardized within the long term evolution (LTE) system. MME provides mobility session management for the LTE network and supports authentication, handovers and roaming between subscribers and other networks.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Outbound Roaming typically occurs when a subscriber travels to another country. That subscriber's home network has an agreement with the network he is visiting in the other country. This agreement permits the subscriber to use his mobile phone to make calls and send messages on this visiting network. The subscriber is "outbound roaming" with respect to his home network providers. Concurrently, in the view of the visited network, this subscriber is "inbound roaming." In other words, the inbound roaming service allows subscribers from other operators to access the local network and services. The outbound roaming service allows subscribers from the local network to access another operator's network and services.

Packet Data Network Gateway (PGW) is used to allocate IP addresses to the user equipment during default bearer setup.

Policy and Charging Rules Function (PCRF) is the software node designated in real-time that supports service data flow detection, policy enforcement and flow-based charging.

Proxy Call Session Control Function (P-CSCF) is a SIP proxy that is the first point of contact for user equipment in a mobile network. All SIP traffic to and from the user equipment must go through the P-CSCF. It acts as the ingress and egress point to and from a service provider's IMS domain with respect to the IMS client.

Public Switched Telephone Network (PSTN) means a circuit switched network that is used primarily for voice communications worldwide.

S6a Interface is Diameter interface between MME and HSS in the LTE network providing messages and procedures for phone attachment.

Serving Call Session Control Function (S-CSCF) is the primary node in the IMS handling session control. Subscribers are assigned a S-CSCF for the duration of their IMS registration to facilitate routing of SIP messages.

Serving Gateway (SGW) routes and forwards user data packets. The SGW manages and stores UE contexts, e.g. parameters of the IP bearer service, network internal routing information.

Serving GPRS Support Node (SGSN) is a main component of the GPRS network, which handles all packet switched data within the network.

Session Initiation Protocol (SIP) is a protocol designed to establish, maintain and terminate multimedia sessions. SIP has been adopted as the main signaling protocol in different network architectures. This SIP is deployed in 3GPP IMS (IP Multimedia System).

Signal Transfer Point (STP) is a node in an SS7 network (2G and 3G) that routes signaling messages based on their destination point code in the SS7 network.

Telephony application server (TAS) means a component used in the core network of a telecom network operator to provide telephony applications and additional multimedia functions. TAS provides the service logic for invoking the media servers to provide the call progress tones and announcements. If the calls originate or terminate on the PSTN, the TAS provides SIP signaling to the MGCF to instruct the media gateways to convert the PSTN TDM voice bit stream to an IP RTP stream and to direct it to the Internet protocol (IP) address of the corresponding IP phone.

Universal Mobile Telecommunications System (UMTS) Terrestrial Radio Access Network (UTRAN) means the radio technology used between mobile terminals and the base stations of 3G UMTS.

User Equipment (UE) means a mobile device connectable to a cellular telecommunications network.

Virtualized Mobility Management Entity (vMME) means a virtualized implementation of the main control plane entity of the network which maintains mobility state of user equipment in a network.

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Public Land Mobile Network (VPLMN) means a network that a mobile subscriber roams on when leaving their Home Public Land Mobile Network (HPLMN).

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. An interworking function (IWF) enabling a home public land mobile network (HPLMN) with voice over long-term evolution (VoLTE) infrastructure to provide voice and short message services (SMS) to subscriber user equipment (UE) roaming in a visited public land mobile network (VPLMN) with circuit-switched (CS) infrastructure without requiring an Internet protocol multimedia subsystem (IMS) registration between the VPLMN and the HPLMN, the IWF comprising:
    a Diameter routing agent (DRA) communicatively coupled to the VPLMN and the HPLMN, the DRA is configured to intercept and mediate messages between the VPLMN and HPLMN;
    a virtual home location register (vHLR) communicatively coupled to a virtual short message service center (vSMSC), a virtual gateway mobile switching center (vGMSC) and a virtual mobility management entity (vMME);
    a serving gateway (SGW) communicatively coupled to the vSMSC and vMME;
    an interconnect border control function (IBCF) communicatively coupled to the vGMSC wherein a mobile application part (MAP) update location request is translated from the VPLMN to a first Diameter update location request (ULR) request, a subscriber telephony service subscription profile is retrieved by the vMME from a home subscriber service (HSS) using a second Diameter user data request (UDR) request, a general packet radio service tunneling protocol (GTP) session is established between a serving gateway (SGW) of the IWF and a packet network data gateway (PGW) of the HPLMN, wherein the PGW is configured to send and receive session initiation protocol (SIP) signaling and voice payload from an IP Multimedia Subsystem (IMS) Core of the HPLMN, a subscriber profile is retrieved from the HSS and translated into a MAP insert-subscriber-data (ISD) request to a mobile switching center MSC and a visitor location register (VLR) of the VPLMN, enabling the VPLMN to provide supplementary services, the vSMSC of the IWF bridges the MSC of the VPLMN and an IP Short Message Gateway (IPSMGW) of the HPLMN, enabling the VPLMN to provide the SMS service to the UE, the vGMSC of the IWF bridges the MSC and VLR of the VPLMN and the IMS Core of the HPLMN using the established GTP tunnel between the SGW of the IWF and the PGW of the HPLMN, enabling the UE to receive Mobile Terminated (MT) voice calls.

2. The IWF of claim 1, wherein the DRA mediates the ULR message by replacing the Origin-Host Attribute-Value-Pair (AVP) with the hostname of the vMME.

3. The IWF of claim 1, wherein the IWF translates a MAP-Send-Auth-Info from VPLMN SGSN or MSC/VLR to a Diameter Authentication-Info-Request to the HSS.

4. The IWF of claim 1, wherein the IWF translates a MAP-Update-Gprs-Location from VPLMN SGSN to a Diameter Update-Location-Request to the HSS.

5. The IWF of claim 1, wherein the IWF sends a SIP REGISTER from a virtual UE to the IMS core to perform SIP registration.

6. The IWF of claim 1, wherein the IMS is configured to use Early IMS Authentication by trusting the SIP REGISTER sent from the SGW of the IWF, and thereby skip the Multimedia-Authentication (MAR/MAA) procedure.

7. The IWF of claim 1, wherein the SGW of the IWF or the P-CSCF of the IMS core inserts an auth-done parameter in the SIP REGISTER request, and thereby the S-CSCF skips the Multimedia-Authentication (MAR/MAA) procedure.

8. The IWF of claim 1, wherein the IWF enables the VPLMN to provide the SMS service to the UE using CS methods.

9. The IWF of claim 1, wherein the IWF enables CS roaming toward the VPLMN and VoLTE roaming toward the HPLMN.

10. A method of enabling a home public land mobile network (HPLMN) with voice over long-term evolution (VoLTE) infrastructure to provide voice and short message services (SMS) to subscriber user equipment (UE) roaming in a visited public land mobile network (VPLMN) with circuit-switched (CS) infrastructure without requiring an Internet protocol multimedia subsystem (IMS) registration between the VPLMN and the HPLMN, the method comprising:
   providing an interworking function (IWF) having a Diameter routing agent (DRA) communicatively coupled to the VPLMN and the HPLMN, the DRA is configured to intercept and mediate messages between the VPLMN and HPLMN;
   providing a virtual home location register (vHLR) in the IWF, the vHLR communicatively coupled to a virtual short message service center (vSMSC), a virtual gateway mobile switching center (vGMSC) and a virtual mobility management entity (vMME);
   providing a serving gateway (SGW) in the IWF, the SGW communicatively coupled to the vSMSC and vMME;
   providing an interconnect border control function (IBCF) in the IWF, the IBCF communicatively coupled to the vGMSC wherein a mobile application part (MAP) update location request is translated from the VPLMN to a first Diameter update location request (ULR) request, a subscriber telephony service subscription profile is retrieved by the vMME from a home subscriber service (HSS) using a second Diameter user data request (UDR) request, a general packet radio service tunneling protocol (GTP) session is established between a serving gateway (SGW) of the IWF and a packet network data gateway (PGW) of the HPLMN, wherein the PGW is configured to send and receive session initiation protocol (SIP) signaling and voice payload from an IP Multimedia Subsystem (IMS) Core of the HPLMN, a subscriber profile is retrieved from the HSS and translated into a MAP insert-subscriber-data (ISD) request to a mobile switching center MSC and a visitor location register (VLR) of the VPLMN, enabling the VPLMN to provide supplementary services, the vSMSC of the IWF bridges the MSC of the VPLMN and an IP Short Message Gateway (IP-SMGW) of the HPLMN, enabling the VPLMN to provide the SMS service to the UE, the vGMSC of the IWF bridges the MSC and VLR of the VPLMN and the IMS Core of the HPLMN using the established GTP tunnel between the SGW of the IWF and the PGW of the HPLMN, enabling the UE to receive Mobile Terminated (MT) voice calls.

11. The method of claim 10, wherein the DRA mediates the ULR message by replacing the Origin-Host Attribute-Value-Pair (AVP) with the hostname of the vMME.

12. The method of claim 10, wherein the IWF translates a MAP-Send-Auth-Info from VPLMN SGSN or MSC/VLR to a Diameter Authentication-Info-Request to the HSS.

13. The method of claim 10, wherein the IWF translates a MAP-Update-Gprs-Location from VPLMN SGSN to a Diameter Update-Location-Request to the HSS.

14. The method of claim 10, wherein the IWF sends a SIP REGISTER from a virtual UE to the IMS core to perform SIP registration.

15. The method of claim 10, wherein the IMS is configured to use Early IMS Authentication by trusting the SIP REGISTER sent from the SGW of the IWF, and thereby skip the Multimedia-Authentication (MAR/MAA) procedure.

16. The method of claim 10, wherein the SGW of the IWF or the P-CSCF of the IMS core inserts an auth-done parameter in the SIP REGISTER request, and thereby the S-CSCF skips the Multimedia-Authentication (MAR/MAA) procedure.

17. The method of claim 10, wherein the IWF enables the VPLMN to provide the SMS service to the UE using CS methods.

18. The method of claim 10, wherein the IWF enables CS roaming toward the VPLMN and VoLTE roaming toward the HPLMN.

19. A system for enabling outbound roamers to use circuit-switched (CS) voice in a Visited Public Land Mobile Network (VPLMN) without the need for voice over long-term evolution (VoLTE) roaming agreements with a Home Public Land Mobile Network (HPLMN) operator, the system comprising:
   a Diameter Routing Agent (DRA) that intercepts and routes Diameter S6a/s6d messages between a VPLMN Mobility Management Entity (MME) and a HPLMN Home Subscriber Server (HSS);
   a virtual Home Location Register (vHLR) that provides a subscriber registration service to a Mobile Switching Center (MSC) in the VPLMN;
   a virtual Mobility Management Entity (vMME) that performs a Long Term Evolution (LTE) registration to the HSS at the HPLMN;
   a virtual Gateway Mobile Switching Center (vGMSC) that delivers a Mobile-Terminated Calls (MT-Call) to the mobile device;
   a Serving Gateway (SGW) that encapsulates IP packets to a General Packet Radio Service Tunneling Protocol (GTP) tunnel towards a Packet Data Network Gateway (PGW) in the HPLMN; and
   an interconnect border control function (IBCF) in an IWF, the IBCF communicatively coupled to the vGMSC wherein a mobile application part (MAP) update location request is translated from the VPLMN to a first Diameter update location request (ULR) request, a subscriber telephony service subscription profile is retrieved by the vMME from a home subscriber service (HSS) using a second Diameter user data request (UDR) request, a general packet radio service tunneling protocol (GTP) session is established between a serving gateway (SGW) of the IWF and a packet network data gateway (PGW) of the HPLMN, wherein the PGW is configured to send and receive session initiation protocol (SIP) signaling and voice payload from an IP Multimedia Subsystem (IMS) Core of the HPLMN, a subscriber profile is retrieved from the HSS and translated into a MAP insert-subscriber-data (ISD) request to a mobile switching center MSC and a visitor location register (VLR) of the VPLMN, enabling the VPLMN to provide supplementary services, the vSMSC of the IWF bridges the MSC of the VPLMN and an IP Short Message Gateway (IPSMGW) of the HPLMN, enabling the VPLMN to provide the SMS service to a UE, the vGMSC of the IWF bridges the MSC and VLR of the VPLMN and the IMS Core of the HPLMN using the established GTP tunnel between the SGW of the IWF and the PGW of the HPLMN, enabling the UE to receive Mobile Terminated (MT) voice calls.

20. A system for enabling outbound roamers to use circuit-switched (CS) SMS service in a Visited Public Land Mobile Network (VPLMN) without the need for voice over long-term evolution (VoLTE) roaming agreements with a Home Public Land Mobile Network (HPLMN) operator, the system comprising:

a Diameter Routing Agent (DRA) that intercepts and routes Diameter S6a/s6d messages between a VPLMN Mobility Management Entity (MME) and a HPLMN Home Subscriber Server (HSS);

a virtual Home Location Register (vHLR) that provides a subscriber registration service to a Mobile Switching Center (MSC) in the VPLMN;

a virtual Mobility Management Entity (vMME) that performs a Long Term Evolution (LTE) registration to the HSS at the HPLMN;

a virtual Short Message Service Center (vSMSC) that receives and routes a Mobile-Originated SMS (MO-SMS) from a mobile device, and delivers a Mobile-Terminate SMS (MT-SMS) to the mobile device;

a Serving Gateway (SGW) that encapsulates IP packets to a General Packet Radio Service Tunneling Protocol (GTP) tunnel towards a Packet Data Network Gateway (PGW) in the HPLMN; and an interconnect border control function (IBCF) in an IWF, the IBCF communicatively coupled to the vGMSC wherein a mobile application part (MAP) update location request is translated from the VPLMN to a first Diameter update location request (ULR) request, a subscriber telephony service subscription profile is retrieved by the vMME from a home subscriber service (HSS) using a second Diameter user data request (UDR) request, a general packet radio service tunneling protocol (GTP) session is established between a serving gateway (SGW) of the IWF and a packet network data gateway (PGW) of the HPLMN, wherein the PGW is configured to send and receive session initiation protocol (SIP) signaling and voice payload from an IP Multimedia Subsystem (IMS) Core of the HPLMN, a subscriber profile is retrieved from the HSS and translated into a MAP insert-subscriber-data (ISD) request to a mobile switching center MSC and a visitor location register (VLR) of the VPLMN, enabling the VPLMN to provide supplementary services, the vSMSC of the IWF bridges the MSC of the VPLMN and an IP Short Message Gateway (IPSMGW) of the HPLMN, enabling the VPLMN to provide the SMS service to a UE, the vGMSC of the IWF bridges the MSC and VLR of the VPLMN and the IMS Core of the HPLMN using the established GTP tunnel between the SGW of the IWF and the PGW of the HPLMN, enabling the UE to receive Mobile Terminated (MT) voice calls.

* * * * *